May 2, 1967  HIROSI NAKANE  3,316,785
LIVE CENTER
Filed May 5, 1965
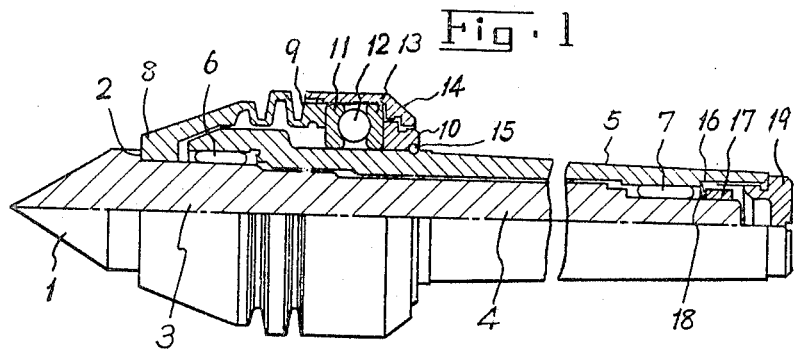
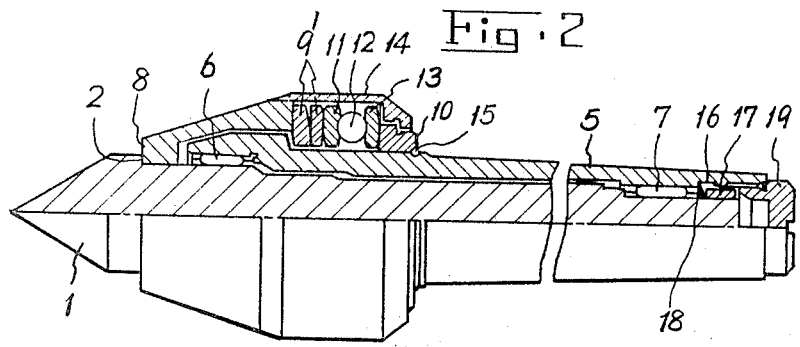
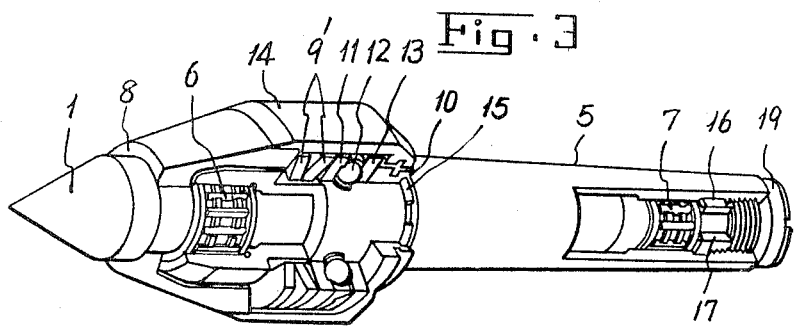
INVENTOR
Hirosi Nakane
BY
Hill, Sherman, Meroni, Gross & Simpson
ATTYS.

3,316,785
LIVE CENTER
Hirosi Nakane, 56, Shimorenjaku, Mitaka-shi,
Tokyo, Japan
Filed May 5, 1965, Ser. No. 453,246
Claims priority, application Japan, May 7, 1964,
39/25,897; (utility model), 39/35,606
3 Claims. (Cl. 82—33)

This invention relates to a live center or a rolling center for rotatively supporting an object to be processed in lathes and the like, more particularly to improvements in the live center.

According to the prior art, when an object to be processed is cut it generates heat with progress of the processing and expands in its axial direction, by which bearings or other mechanisms of a live center are often broken or sometimes the object to be processed is bent.

Accordingly, one object of this invention is to provide a live center which withstands a great thrust caused in the axial direction thereof.

Another object of this invention is to provide a live center which resiliently receives a great thrust caused in the axial direction thereof, thereby to avoid breakage of an object to be processed and the live center itself.

A further object of this invention is to provide a live center in which ball bearings are disposed on the outside of a stationary shaft sleeve and the ball bearings are covered with a protective cover so that shavings do not enter between the stationary part and the rotary part and the ball bearing are not ever damaged.

Other objects, features and advantages of this invention will be apparent from the following description taken in conjunction with the accompanying drawings, in which:

FIGURE 1 is a partially longitudinal cross-sectional view illustrating an example of a live center according to this invention;

FIGURE 2 is also a partially longitudinal cross-sectional view illustrating another example of the live center according to this invention; and FIGURE 3 is a perspective view of the live center shown in FIGURE 2, having one portion broken away.

With reference to the drawings, the present invention will be explained. In FIGURE 1, 1 shows a conical head, at which is held an object to be processed. In the present invention a rotary shaft is integrally made up of the conical head, a neck 3 having a stepped portion 2 and a long body 4 contigious to the neck 3. One portion of the neck 3 and the body 4 are inserted into a stationary shaft sleeve 5. 6 and 7 are needle bearings provided between the stationary shaft sleeve 5 and the rotary shaft respectively at the front and the rear thereof. 8 is a bearing annulus made of, for example, steel, which is positioned around the neck 3 of the rotary shaft in such a manner as to surround the front portion of the stationary shaft sleeve 5. This bearing annulus 8 has a resilient corrugated portion as identified at 9. Since the bearing annulus 8 rotates together with the conical head, it is arranged in spaced relation to the stationary shaft sleeve 5. 10 is an annulus mounted on the stationary shaft sleeve 5. Between the rear end of the bearing annulus 8 and the annulus 10, there is disposed a ball bearing which comprises a rotary bearing ring 11 secured to the rotary bearing annulus 8, rotary balls 12 and a stationary bearing ring 13 secured to the annulus 10 which is in turn fixed to the stationary shaft sleeve 5. 14 is a cover ring surrounding the ball bearing members 11, 12 and 13, which ring is screwed into the bearing annulus 8 to be fixed thereto. 15 is a snap ring provided on the stationary shaft sleeve 5. 16 is a stepped portion which has been so formed as to extend outwardly of the stationary shaft sleeve 5 at the rear of the needle bearing 7 provided between the rotary shaft and the stationary shaft sleeve 5. Another annulus 17 is secured around the rotary shaft at the rear end thereof. Between the annulus 17 and the stepped portion 16 is arranged a dish spring 18 in a manner such that it may rotate in contact with the rotary shaft. The end of the stationary shaft sleeve 5 is covered with an end cover 19. The annulus 17 is spaced from the stationary shaft sleeve 5. Accordingly, a shock applied in the axial direction from the end cover 19 can be absorbed by the dish spring 18. Furthermore, a lubricant is sealed in the ball bearing and the needle bearings and, if necessary, a packing is suitably provided so as to avoid release of the lubricant. That is, a packing is provided, for example, between the annulus 10 and the cover ring 14.

According to the present invention described in the foregoing, a thrust, which is applied to the conical head 1 holding an object to be processed, is turned in accordance with the rotation of the object and applied to the stationary shaft sleeve through the bearing annulus 8, the rotary bearing ring 11, the balls 12 and the stationary bearing ring secured to the stationary shaft sleeve 5, so that the live center of this invention can sufficiently receive a greater thrust than conventional ones having a ball bearing arranged inside of a stationary shaft sleeve. The corrugated portion 9 of the bearing annulus 8 which surrounds the front of the stationary shaft sleeve 5 has a resilient effect. Therefore, even if a great thrust is caused in the axial direction in the case where, for example, the object to be processed generates heat and expands due to cutting, such a thrust can be transmitted to the ball bearing after resiliently absorbed at the corrugated portion 9. In the example shown in FIGURE 1, the conical head 1 can be resiliently pushed backward up to 2 mm. owing to the corrugated portion 9.

As has been described in the foregoing, in the present invention the ball bearing is placed on the outside of the stationary shaft sleeve 5 and the cover ring 14 covers the ball bearing and others, so that shavings do not ever enter the inside of the live center from between the stationary and the rotary parts and the bearings are not ever damaged. In addition, since the bearing annulus 8 and the cover ring 14 rotate together with the conical head 1, dusts and shavings attached to them are sent flying due to centrifugal force. Accordingly, no troubles in the live center are caused by the shavings and the like.

The live center, produced according to the present invention such as described above, can withstand a great thrust or shock by making use of resiliency of the corrugated portion provided on the bearing annulus. In addition, since the ball bearing and so on are covered by the cover ring and shavings or the like do not exert any bad influences upon the processing, precision of the processing can be enhanced. It is needless to say that the live center of this invention can stand long use.

FIGURE 2 illustrates an example in which resiliency is afforded by the provision of a rotary dish spring 9' between a rotary bearing ring 11 and the rear end of a bearing annulus 8, instead of the provision of the corrugated portion 9 on the bearing annulus 8 such as shown in FIGURE 1. Furthermore, the dish spring can be interposed between a stationary bearing ring 13 and an annulus 10. It will easily be understood that the spring performs exactly the same function as the corrugated portion 9 shown in FIGURE 1. The other portions of this example are the same as those explained in connection with FIGURE 1 and the corresponding portions are marked with the same numeral references. For the sake of brevity, no detailed explanation will be made.

It will be apparent that many modifications and variations may be effected without departing from the scope of the novel concept of this invention.

What is claimed is:

1. A live center comprising a rotary shaft integrally made up of a conical head, a neck having a stepped portion and a long body contiguous thereto, a stationary shaft sleeve surrounding said body, needle bearings disposed between said body and said stationary shaft sleeve, a bearing annulus, said bearing annulus being mounted on the body in such a manner that the front end of the bearing annulus may abut on the stepped portion of the body, an annulus secured around said stationary shaft sleeve, a ball bearing inserted between said annulus and the rear end of said bearing annulus, a resilient member abutting on said ball bearing to absorb a thrust applied thereto from said bearing annulus, and a cover ring mounted on said bearing annulus to surround the same.

2. A live center comprising a rotary shaft integrally made up of a conical head, a neck having a stepped portion and a long body contiguous thereto, a stationary shaft sleeve surrounding said body, needle bearings disposed between said body and said stationary shaft sleeve, a bearing annulus, said bearing annulus being mounted on the body in such a manner that the front end may abut on the stepped portion of the body and the rear part of the bearing annulus being provided with a corrugated portion resilient in the axial direction, an annulus secured around said stationary shaft sleeve, a ball bearing inserted between said annulus and the rear end of said bearing annulus, and a cover ring mounted on said bearing annulus to surround the same.

3. A live center comprising a rotary shaft integrally made up of a conical head, a neck having a stepped portion and a long body contiguous thereto, a stationary shaft sleeve surrounding said body, needle bearings disposed between said body and said stationary shaft sleeve, a bearing annulus, said bearing annulus being mounted on the body in such a manner that the front end of the bearing annulus may abut on the stepped portion of the body, an annulus secured around said stationary shaft sleeve, a ball bearing inserted between said annulus and the rear end of said bearing annulus, a rotary dish spring provided around said stationary shaft sleeve in contact relation to said ball bearing to absorb a thrust applied to the ball bearing from said bearing annulus, and a cover ring mounted on said bearing annulus to surround said ball bearing and said rotary dish spring.

References Cited by the Examiner

UNITED STATES PATENTS 2,844,063   7/1958   Rohm _____ 82—33

FOREIGN PATENTS 280,249   4/1952   Switzerland.

WILLIAM W. DYER, JR., *Primary Examiner.*

LEONIDAS VLOCHOS, *Examiner.*